(Model.)
S. P. HARBAUGH.
WIRE STRETCHER.
No. 252,104. Patented Jan. 10, 1882.
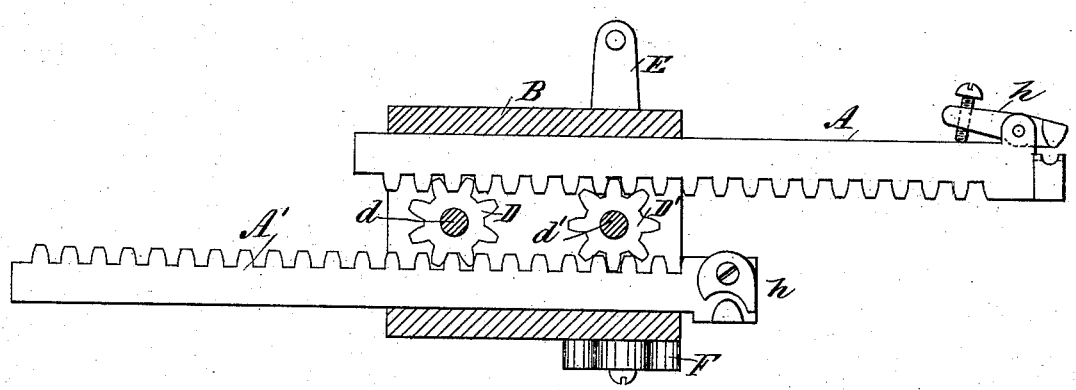
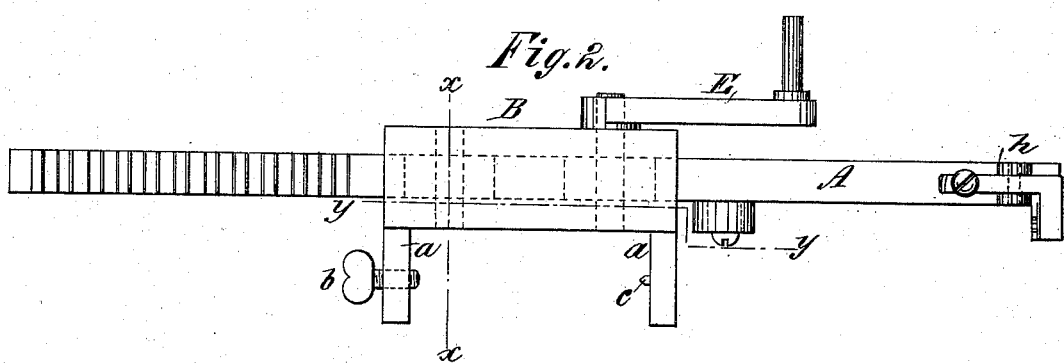
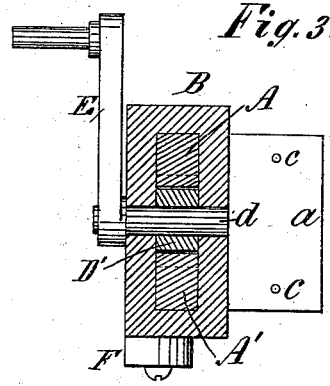
WITNESSES:
Theo. F. Hoster
C. Sedgwick
INVENTOR:
S. P. Harbaugh
BY Munn & Co
ATTORNEYS.

UNITED STATES PATENT OFFICE.

SIMON P. HARBAUGH, OF CUMBERLAND, MARYLAND.

WIRE-STRETCHER.

SPECIFICATION forming part of Letters Patent No. 252,104, dated January 10, 1882.

Application filed May 21, 1881. (Model.)

*To all whom it may concern:*

Be it known that I, SIMON P. HARBAUGH, of Cumberland, in the county of Alleghany and State of Maryland, have invented a new and Improved Wire-Stretcher, of which the following is a full, clear, and exact description.

The object of my invention is the production of an efficient and cheaply-constructed device for stretching wires of wire fences or cables of any description.

In the accompanying drawings, Figure 1 is a section of my invention, taken on the line $y$ $y$ of Fig. 2. Fig. 2 is a plan view, and Fig. 3 is a cross-section taken on the line $x$ $x$ of Fig. 2.

Similar letters of reference indicate corresponding parts.

A A' represent the rack-bars, and B represents the frame, which latter is a sleeve or box open at both ends, preferably rectangular in form, and provided with the side parallel extensions, $a$ $a$, by which the device may be attached to the fence-post or other object and fastened there by means of the studs $c$ $c$ and the thumb-screw $b$.

Upon the shafts $d$ $d'$, which are journaled in the side plates of the frame, are placed the pinions D D'. The pinion D' is adapted to be revolved by means of the crank E, which is secured upon the end of the shaft $d'$. The rack-bars A A' are placed in the frame so as to run in contact with opposite sides of the pinions, so that when the pinion D' is turned by the crank the rack-bars will have longitudinal movement in opposite directions, the pinion D serving to keep the bars parallel with each other. The ends of the rack-bars may be provided with any suitable clamps, $h$ $h$, for grasping and holding the wire or cable.

In use, the device being secured to the post or other object, as above described, the wire is clamped to the end of one of the rack-bars, and the crank is then turned, which carries the bar and wire forcibly forward. The wire is then clamped upon the other bar and the crank turned in the reverse direction, thus causing the wire to be again forcibly carried forward; and this operation is to be repeated until the wire is drawn taut and secured to the post.

The side of the frame is provided with the double button F, for holding the handle E while the wire is being secured to the post or other object.

Though I have shown only one end of the rack-bars provided with clamps for grasping the wire, it is obvious that both ends of said bars may be provided with clamps, so that the wire may be stretched in either direction from the same side of the post or object.

Having thus described my invention, I claim as new and desire to secure by Letters Patent—

A wire-stretcher consisting of the racks A A', having a wire-clamp at one end, the sleeve-frame B, having extensions $a$ $a$ with studs $c$, the shafts $d$ $d'$, of which one carries a hand-crank, E, and the pinions D D', the whole adapted to be used in putting up a wire fence, as described.

SIMON P. HARBAUGH.

Witnesses:
GEO. W. HOOVER,
WILLIAM EARNEST.